United States Patent Office 2,920,097
Patented Jan. 5, 1960

2,920,097

O,O-DIALKYL-β-CYANOVINYL PHOSPHONATES

Everett J. Frazza, Yorktown Heights, N.Y., and Lorence Rapoport, Stamford, Conn., assignors to American Cyanamid Company, New York, N.Y., a corporation of Maine No Drawing. Application December 24, 1957
Serial No. 704,877

4 Claims. (Cl. 260—461)

This invention relates to a new class of compounds. More particularly, it relates to O,O-dialkyl-β-cyanovinyl phosphonates and the preparation thereof.

The new class of O,O-dialkyl-β-cyanovinyl phosphonates is prepared according to the process of this invention by the cyanovinylation of dialkyl hydrogen phosphites. More particularly, the products of this invention are obtained by reacting β-chloroacrylonitrile with a dialkyl hydrogen phosphite in an inert reaction medium. On completion of the reaction, which is conducted at below about 100° F., the precipitate is separated by conventional means and the O,O-dialkyl-β-cyanovinyl phosphonate recovered from the residual liquor as by distillation or crystallization.

The particular reaction medium employed in the process of this invention is restricted only in that it be inert to the reactants. Any of the conventional materials, including water, which are generally employed in this capacity are suitable. Chlorinated aliphatic hydrocarbons such as carbon tetrachloride and trichlorethylene; benzene and its homologues and their halogenated derivatives; amides, esters, ethers, ketones and the like may all be used. During the reaction, it is also preferable to have present an acceptor to fix the hydrogen chloride. Illustrative of the various materials which may be employed for this purpose are inorganic bases such as sodium carbonate and bicarbonate; and tertiary amines such as triethylamine, N-ethylmorpholine, dimethylbenzylamine, tributylamine, pyridine, N-methylpyridine and the like.

The compounds of the present invention may also be prepared by reacting β-chloroacrylonitrile with a salt of a dialkyl hydrogen phosphite such as an alkali metal salt preferably sodium or potassium. When prepared in this manner, the alkali metal combines with the chlorine and the addition of an HCl acceptor need not be made. The compounds may also be prepared by reacting a trialkyl phosphite with β-chloroacrylonitrile. In this instance, also, the addition of an HCl acceptor need not be made since the chlorine is removed as an alkyl chloride.

Any of the various dialkyl and trialkyl phosphites as well as the alkali salts of the former may be employed in this invention. Methyl, ethyl, n-propyl, isopropyl, n-butyl, isobutyl, sec-butyl, n-hexyl, 2-ethylhexyl, n-dodecyl, t-dodecyl, n-octadecyl and the like are illustrative of alkyl phosphites which may be readily employed.

The compounds of this invention have various uses. Among these may be mentioned their use in the field of agriculture wherein herbicidal properties have been demonstrated. The unsaturation of these compounds, also, renders them useful in the preparation of a variety of copolymers for use in recognized fields.

The following examples will illustrate the invention. All parts are by weight unless otherwise indicated.

Example 1

O,O-DIETHYL-β-CYANOVINYL PHOSPHONATE

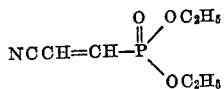

To a stirred solution of 41.4 parts of O,O-diethyl hydrogen phosphite, 30.4 parts of triethylamine and 100 parts of benzene is added 26.3 parts of β-chloroacrylonitrile, the temperature being held below 38° C. by external cooling. When the exotherm subsides, the mixture is allowed to stand overnight at room temperature. After the addition of 150 parts of ether, the precipitate is filtered off and the filtrate distilled, giving 29.5 parts of crude product boiling at 87–92°/0.25 mm. Redistillation gave 23.8 parts (42% yield) of O,O-diethyl-β-cyanovinyl phosphonate boiling at 83–87°/0.3–0.5 mm.; $n_D^{25}$ 1.4501. Calc'd. for $C_7H_{12}NO_3P$: C, 44.44; H, 6.40; N, 7.41. Found: C, 44.30; H, 6.53; N, 7.47. An aqueous dispersion of the compound gives 100% kill of wheat and radish seeds, representing dioctylendonous plants, at a concentration of 0.1%.

Example 2

The procedure of Example 1 is repeated using the sodium salt and omitting the triethylamine.

Example 3

The procedure of Example 1 is repeated replacing O,O-diethyl hydrogen phosphite with di-n-propyl, di-isobutyl, and di-n-hexyl hydrogen phosphite to obtain the O,O-di-n-propyl-β-cyanovinyl phosphonates, O,O-di-isobutyl-β-cyanovinyl phosphate and di-n-hexyl-β-cyanovinyl phosphonate.

O,O-DIBUTYL β-CYANOVINYL PHOSPHONATE

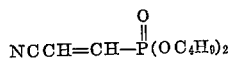

A solution of 12.5 parts of tributyl phosphite and 5.36 parts of β-chloroacrylonitrile is heated in an oil bath when the reaction mixture reaches 127° C. volatile liquid distilled. Heating is continued until the temperature reaches 154° C., at which point the reaction is essentially complete and with 2.8 parts of butyl chloride distilled over. Two distillations of the residue give 6.56 parts of O,O-dibutyl β-cyanovinyl phosphonate boiling at 119–120°/0.3 mm., $n_D^{25}$ 1.4505. Calculated for $C_{11}H_{20}NO_3P$: C, 53.87; H, 8.22; N, 5.71. Found: C, 54.05, H, 8.30; N, 5.44.

Example 5

The procedure of Example 4 is repeated replacing tributyl phosphite with tripropyl phosphite and triethyl phosphite to give O,O-dipropyl β-cyanovinyl phosphonate and triethyl β-cyanovinyl phosphonate.

We claim:
1. A method of preparing an O,O-dialkyl-β-cyanovinyl phosphonate which comprises reacting β-chloroacrylonitrile with a member selected from the group consisting of dialkyl hydrogen phosphites, the alkali metal salts thereof, and trialkyl phosphites.
2. A method according to claim 1 in which the member is a dialkyl hydrogen phosphate.

3. A method according to claim 1 in which the member is an alkali metal salt of a dialkyl hydrogen phosphite.

4. A method according to claim 1 in which the member is a trialkyl phosphite.

References Cited in the file of this patent

UNITED STATES PATENTS 2,721,876    Dickey et al. _____ Oct. 25, 1955

OTHER REFERENCES

Arbuzov et al.: "Chem. Abst.," vol. 45, col. 7002 (1951).

Abramov et al.: "Zhur. Obshchei Khim," 26, 2014–19 (1956) (in Russian).

UNITED STATES PATENT OFFICE
CERTIFICATE OF CORRECTION

Patent No. 2,920,097　　　　　　　　　　　　　　January 5, 1960

Everett J. Frazza et al.

It is hereby certified that error appears in the printed specification of the above numbered patent requiring correction and that the said Letters Patent should read as corrected below.

Column 2, line 36, for "phosphate and di-n-hexyl-" read -- phosphonate and O,O-di-n-hexyl- --; line 38, center and insert in italics the heading -- Example 4 --; line 66, for "phosphate" read -- phosphite --.

Signed and sealed this 29th day of November 1960.

(SEAL)
Attest:

KARL H. AXLINE
Attesting Officer

ROBERT C. WATSON
Commissioner of Patents